United States Patent
Abts

(10) Patent No.: US 10,084,718 B1
(45) Date of Patent: Sep. 25, 2018

(54) BI-CONNECTED HIERARCHICAL DATA CENTER NETWORK BASED ON MULTI-PORTED NETWORK INTERFACE CONTROLLERS (NICS)

(71) Applicant: Google Inc., Mountain View, CA (US)

(72) Inventor: Dennis Charles Abts, Mountain View, CA (US)

(73) Assignee: Google LLC, Mountain View, CA (US)

( * ) Notice: Subject to any disclaimer, the term of this patent is extended or adjusted under 35 U.S.C. 154(b) by 453 days.

(21) Appl. No.: 14/145,114

(22) Filed: Dec. 31, 2013

Related U.S. Application Data

(63) Continuation-in-part of application No. 14/144,706, filed on Dec. 31, 2013.

(60) Provisional application No. 61/788,908, filed on Mar. 15, 2013.

(51) Int. Cl.
*H04L 12/803* (2013.01)
*H04L 12/869* (2013.01)

(52) U.S. Cl.
CPC .................. *H04L 47/60* (2013.01)

(58) Field of Classification Search
CPC ..... H04L 49/356; H04L 49/10; H04L 45/125; H04L 12/24; H04L 45/34; H04L 47/60; G06F 12/0811
USPC ........ 370/238, 389, 392, 400, 401; 709/216, 709/226
See application file for complete search history.

(56) References Cited

U.S. PATENT DOCUMENTS

| | | | |
|---|---|---|---|
| 6,151,297 A | 11/2000 | Congdon et al. | |
| 6,456,588 B1 | 9/2002 | Simmons | |
| 6,696,917 B1 | 2/2004 | Heitner et al. | |
| 8,065,433 B2 | 11/2011 | Guo et al. | |
| 8,412,919 B2 | 4/2013 | Luo | |
| 9,288,101 B1 | 3/2016 | Dalal et al. | |
| 9,436,639 B1 * | 9/2016 | Dalal ............... | H04L 47/193 |
| 2011/0258340 A1 | 10/2011 | Armstrong et al. | |
| 2012/0026917 A1 * | 2/2012 | Guo ................. | H04L 12/24 |
| | | | 370/254 |
| 2012/0230182 A1 * | 9/2012 | Southworth ....... | H04L 49/3009 |
| | | | 370/217 |
| 2012/0250574 A1 * | 10/2012 | Marr ................ | H04L 41/12 |
| | | | 370/254 |

(Continued)

OTHER PUBLICATIONS

Batcher, Kenneth E. "STARAN parallel processor system hardware." Proceedings of the May 6-10, 1974, national computer conference and exposition. ACM, 1974.

(Continued)

*Primary Examiner* — Walli Butt
(74) *Attorney, Agent, or Firm* — McDermott Will & Emery LLP

(57) ABSTRACT

The exemplary embodiments provide an indirect hypercube topology for a datacenter network. The indirect hypercube is formed by providing each host with a multi-port network interface controller (NIC). One port of the NIC is connected to a fat-tree network while another port is connected to a peer host forming a single dimension of an indirect binary n-cube. Hence, the composite topology becomes a hierarchical tree of cubes. The hierarchical tree of cubes topology uses (a) the fat-tree topology to scale to large host count and (b) the indirect binary n-cube topology at the leaves of the fat-tree topology for a tightly coupled high-bandwidth interconnect among a subset of hosts.

18 Claims, 10 Drawing Sheets

(56) References Cited

U.S. PATENT DOCUMENTS

| | | | | |
|---|---|---|---|---|
| 2013/0111070 | A1* | 5/2013 | Mudigonda | H04L 41/145 709/250 |
| 2013/0250802 | A1* | 9/2013 | Yalagandula | H04L 41/12 370/254 |
| 2014/0119728 | A1* | 5/2014 | Zhang | H04J 14/0204 398/48 |
| 2014/0122560 | A1* | 5/2014 | Ramey | G06F 15/17312 709/201 |
| 2014/0298113 | A1 | 10/2014 | Sakurai et al. | |

OTHER PUBLICATIONS

Bhuyan, Laxmi N., and Dharma P. Agrawal. "Generalized hypercube and hyperbus structures for a computer network." Computers, IEEE Transactions on 100.4 (1984): 323-333.

Guo, Chuanxiong, et al. "BCube: a high performance, server-centric network architecture for modular data centers." ACM SIGCOMM Computer Communication Review 39.4 (2009): 63-74.

Mitra, Debasis, and Randall A. Cieslak. "Randomized parallel communications on an extension of the omega network." Journal of the ACM (JACM) 34.4 (1987): 802-824.

Preparata, Franco P., and Jean Vuillemin. "The cube-connected cycles: a versatile network for parallel computation." Communications of the ACM 24.5 (1981): 300-309.

Abts, et al., Achieving Predictable Performance through Better Memory Controller Placement in many Core CMPs, ACM Sigarch Computer Architecture News, vol. 37, No. 3, Jun. 2009, p. 451-462.

Ahn et al., HyperX: Topology Routing and Packaging of Efficient Large-Scale Networks, Proceedings of the Conference on High Performance Computing Networking, Storage and Analysis, IEEE, Nov. 2009, pp. 1-11.

Al-Fares et al., A Scalable Commodity Data Center Network Architecture, ACM SIGCOMM Computer Communication Review, vol. 38, No. 4, ACM, Aug. 2008. pp. 63-74.

Al-Fares et al., Hedera: Dynamic Flow Scheduling for Data Center Networks, NSDI. vol. 10, 2010, 15 pgs.

Arimilli et al., The PERCS High Performance Interconnect, 2010 18th IEEE Symposium on High Performance Interconnects, IEEE, 2010, 8 pgs.

Benson, et al., Network Traffic Characteristics of Data Centers in the Wild, Proceedings of the 10th ACM SIGCOMM conference on Internet measurement, ACM, 2010, 14 pgs.

Clos, Charles, A Study of Non-Blocking Switching Networks, Bell System Technical Journal, vol. 32, No. 2, 1953, pp. 406-424.

Dally, et al., Deadlock-Free Message Routing in Multiprocessor Interconnection Networks, IEEE Transactions on Computers, vol. 100, No. 5, 1987, pp. 547-553.

Dally, William J., Performance analysis of k-ary n-cube interconnection networks, IEEE Transactions on Computers, vol. 39, No. 6, Jun. 1990, p. 775-785.

Dean, et al., MapReduce: Simplified Data Processing on Large Clusters, Communications of the ACM, vol. 51, No. 1, 2008, pp. 107-113.

Glass et al., The Turn Model for Adaptive Routing, ACM SIGARCH Computer Architecture News, vol. 20, No. 2, ACM, Apr. 1992, pp. 278-287.

Greenberg et al., VL2: A Scalable and Flexible Data Center Network, ACM SIGCOMM Computer Communication Review, vol. 39, No. 4, Aug. 2009, pp. 51-62.

Kermani et al., Virtual Cut Through a New Computer Communication Switching Technique, Computer Networks, vol. 3, No. 4, 1976, pp. 267-286.

Kim, et al., Adaptive Routing in High-Radix Clos Network, Proceedings of the ACM/IEEE SC 2006 Conference, Nov. 2006, 11 pgs.

Kim, et al., Flattened Butterfly: A Cost Efficient Topology for high Radix Networks, ACM SIGARCH Computer Architecture News, vol. 35, No. 2, ACM, Jun. 2007, 12 pgs.

Kim, et al., Microarchitecture of a High-Radix Router, ACM SIGARCH Computer Architecture News, vol. 33, No. 2, IEEE Computer Society, Jun. 2005, pp. 420-431.

Kim et al., Technology Driven Highly Scalable Dragonfly Topology, ACM SIGARCH Computer Architecture News, vol. 36, No. 3, 2008, pp. 77-88.

Sharma et al., Viking: A Multi Spanning Tree Ethernet Architecture for Metropolitan Area and Cluster Networks, INFOCOM 2004, Twenty-third Annual Joint Conference of the IEEE Computer and Communications Societies, vol. 4, IEEE, Mar. 2004, 12 pgs.

Siegel et al., Study of Multistage SIMD Interconnection Networks, Proceedings of the 5th annual symposium on Computer architecture, ACM, Apr. 1978, pp. 223-229.

Singh et al., Globally Adaptive Load Balanced Routing on Tori, Computer Architecture Letters, vol. 3, No. 1, 2004, 4 pgs.

Singh et al., Goal: A Load Balanced Adaptive Routing Algorithm for Torus Networks, ACM SIGARCH Computer Architecture News, vol. 31, No. 2, 2003, pp. 194-205.

Singh et al., Locality-Preserving Randomized Oblivious Routing on Torus Networks, Proceedings of the fourteenth annual ACM symposium on Parallel algorithms and architectures. ACM, Aug. 2002, 11 pgs.

Valiant, et al., Universal Schemes for Parallel Communication, Proceedings of the thirteenth annual ACM symposium on Theory of computing, ACM, May 1981, pp. 263-277.

Yuan, Xin, On Nonblocking Folded-Cios Networks in Computer Communication Environments, Parallel & Distributed Processing Symposium (IPDPS), 2011 IEEE International, IEEE, May 2011, 9 pgs.

U.S. Office Action dated Apr. 20, 2016 in U.S. Appl. No. 14/149,469.
Notice of Allowance dated Mar. 27, 2017 in U.S. Appl. No. 14/149,469.
Office Action dated Nov. 3, 2016 in U.S. Appl. No. 14/149,469.
U.S. Office Action dated Jul. 14, 2017 in U.S. Appl. No. 15/609,847.
U.S. Notice of Allowance dated Oct. 2, 2017 in U.S. Appl. No. 15/609,847.
Notice of Allowance dated Jan. 3, 2018 in U.S. Appl. No. 15/609,847.

* cited by examiner

BI-CONNECTED HIERARCHICAL DATA CENTER NETWORK BASED ON MULTI-PORTED NETWORK INTERFACE CONTROLLERS (NICS)

RELATED APPLICATIONS

The present application claims priority to a United States provisional application, Patent Application No. 61/788,908, filed Mar. 15, 2013, and is a continuation-in-part of the U.S. patent application Ser. No. 14/144,706 concurrently filed herewith, the contents of which are incorporated herein by reference.

BACKGROUND

A conventional datacenter typically employs a datacenter network that is organized as a fat-tree network. FIG. 1 shows an example of the topology for such a conventional fat-tree datacenter network 100. Topology, as used herein, incorporates a set of hosts, switches and the links that interconnect the hosts and the switches. The interconnections in a topology may be represented using a directed graph. The fat-tree datacenter network 100 includes higher level switches such as aggregation switches 110 and 112. The aggregation switches 110 and 112 are connected to each of spine switches 120. Each spine switch 120 is connected to a plurality of top-of-rack (ToR) switches 130. In the example shown in FIG. 1, each spine switch 120 is connected to eight of the ToR switches 130. The ToR switches 130 are configured to connect with racks of hosts 140. The racks of hosts 140 may be for example, racks of servers that provide services for the datacenter.

Hosts within a given rack 140 may be connected to the ToR switch 130 by a common electrical or fiber optic networking cable. The switching elements in the network, such as routers and/or switches such as the aggregation switches 110, 112, the spine switches 120 and the ToR switches 130, may have multiple ports, commonly referred to as the switch radix or degree. For example, the switching elements may have 12, 24, 32, 36 or 64 ports. The ports may be logically assigned as "up links" and "down links" to designate upward and downward facing ports, respectively. Up links route packets between stage N and stage N+1 (i.e. up the tree) of a multi-stage network, such as the fat-tree datacenter network 100. Down links route packets between stage N+1 and stage N (i.e. down the tree) of the multi-stage network, e.g. the fat-tree datacenter network 100. If all ports have the same bandwidth, then the ratio of up links to down links may be varied to change the network performance and cost profile.

For example, a switch that has k up links and k down links is said to be "fully provisioned" since the bandwidth between successive stages of the interconnection network is matched. A switch with m down links and n up links, where m>n (i.e. more down links than up links) is said to be "under provisioned" or equivalently "over-subscribed" since the upward-facing links do not have sufficient bandwidth to carry all the traffic flowing from downward-facing links. The oversubscription point is typically at the lowest stage of the network, commonly the top of rack switch 130, to reduce the overall network cost since more hosts, e.g. racks 140, are sharing the aggregate network bandwidth. A typical datacenter network may be oversubscribed by 2×, 4×, 8× or more to balance the communication demands from applications and overall network cost.

Since multiple hosts share the fat-tree network of the datacenter, only a few of the hosts are likely to use their available injection bandwidth simultaneously. Injection bandwidth, in this context, is equivalent to the bit rate of the physical channel present at the host. Each host is assumed to be coupled to a ToR switch 130 in the network using a network interface controller (NIC). To take advantage of only a few of the hosts using their available injection bandwidth, oversubscription is often used in datacenter networks to allow the aggregate host injection bandwidth to exceed the capacity of the network.

FIG. 2 visually depicts the phenomena of oversubscription. For a given ToR switch 210, the outgoing bandwidth 220 is significantly less than the host facing bandwidth 230 originating from the host 240. Oversubscription may be expressed as an oversubscription ratio, which is the degree to which the aggregate bandwidth exceeds the network capacity. The network capacity refers to the maximum load that a minimum bisector of the network can sustain for uniformly distributed traffic. A bisector is a set of links that, when removed, bifurcates the network at equal halves. The minimum bisector is the bisector containing the minimum number of edges over the bisectors of the network.

SUMMARY

Various embodiments may provide a method comprising creating an indirect generalized hypercube in a network. The network may have a plurality of hosts and a plurality of switching elements. The indirect generalized hypercube may have a pre-determined number of dimensions n and a pre-determined radix k. The creating may include interconnecting the plurality of hosts and the plurality of switching elements in the network. A first host among the plurality of hosts has a first port and a second port. A second host among the plurality of hosts has a first port and a second port. The first port of the first host is connected to one of the plurality of switching elements. The second port of the first host is connected to the first port or the second port of the second host. The one of the plurality of switching elements is connected to k–1 hosts in each dimension, the k–1 hosts including the second host. The method may also include routing network traffic over the indirect generalized hypercube.

In some embodiments, a method includes receiving a packet at a first port of a multi-port network interface controller (NIC) in a network. The multi-port NIC is coupled to a first host in the network, the first port of the multi-port NIC connects the first host to a first switching element of the network. The method also includes inspecting a destination field of the packet to determine if the packet is destined for the first host. The inspecting may compare the destination field of the packet with an address associated with the first port of the multi-port NIC. The inspecting may also determine whether the destination field of the packet matches the address associated with the first port of the multi-port NIC. The method may further includes routing the packet through to the first host if the destination field of the packet matches the address associated with the first port of the multi-port NIC. The method may also include echoing the packet on a second port of the multi-port NIC if the destination field of the packet fails to match the address associated with the first port of the multi-port NIC. The second port of the multi-port NIC connects the first host to a second host in the network. The second port of the multi-port NIC connects the first host to a second host in the network. The second host is connected to a second switching element. The network includes an indirect generalized hypercube having a pre-determined number of dimensions n and a pre-determined radix k. The first switching element is connected to k−1 hosts in each dimension, the k−1 hosts including the second host.

Embodiments may also provide a system having an indirect generalized hypercube topology. The system may include a plurality of switching elements and a plurality of hosts. The plurality of hosts may include a first host and a second host. Each of the plurality of hosts has a first port and a second port. The first port of the first host is connected to the first port or the second port of the second host. The second port of the first host is connected to one of the plurality of switching elements to create the indirect hypercube topology. The indirect generalized hypercube has a pre-determined number of dimensions n and a pre-determined radix k. The one of the plurality of switching elements is connected to k−1 hosts in each dimension, the k−1 hosts including the second host.

DETAILED DESCRIPTION

The exemplary embodiments described herein provide a novel topology for a network. The topology is especially well-suited for use with a datacenter network. The novel topology adds a second ingress/egress port to each host. The second port is used to interconnect each host with a nearby host. In this fashion, a subset of nearby hosts is interconnected with switches to form an indirect generalized hypercube, i.e. G-cube. The novel hierarchal network topology is formed of a tree of G-cubes that delivers higher bandwidth and lower latency than a conventional fat-tree topology. In addition, the topology described herein exploits abundant path diversity to improve network reliability. In the proposed topology, each host is bi-connected to provide both increased bandwidth and improved reliability. If a host-to-switch link fault occurs, the affected port is deemed "inactive" and all subsequent traffic will automatically use the "active" port.

The novel topology is formed by providing each host with a multi-port network interface controller (NIC). One port of the NIC connects to the fat-tree network while another port connects to a peer host forming a single dimension of an indirect G-cube. Hence, the composite topology becomes a tree of G-cubes. The G-cube subnetwork may scale from 2 to 384 or more hosts within a multidimensional indirect G-cube. The hierarchical tree of G-cubes topology uses (a) the fat-tree topology to scale to large host count and (b) the indirect G-cube topology at the leaves of the fat-tree topology for a tightly coupled high-bandwidth interconnect among a subset of hosts. One of ordinary skill in the art will appreciate that connecting peer hosts is significantly less expensive than incorporating a second NIC port directly to the ToR switch and integrating the ToR switch with the second NIC port into the fat-tree topology. In general, connecting the indirect G-cube requires half the number of cables (since peer hosts are connected together directly) and does not require additional ToR switch ports. The additional cost of the 2-port NIC is small relative to the cost of a 1-port NIC.

Figure 1:
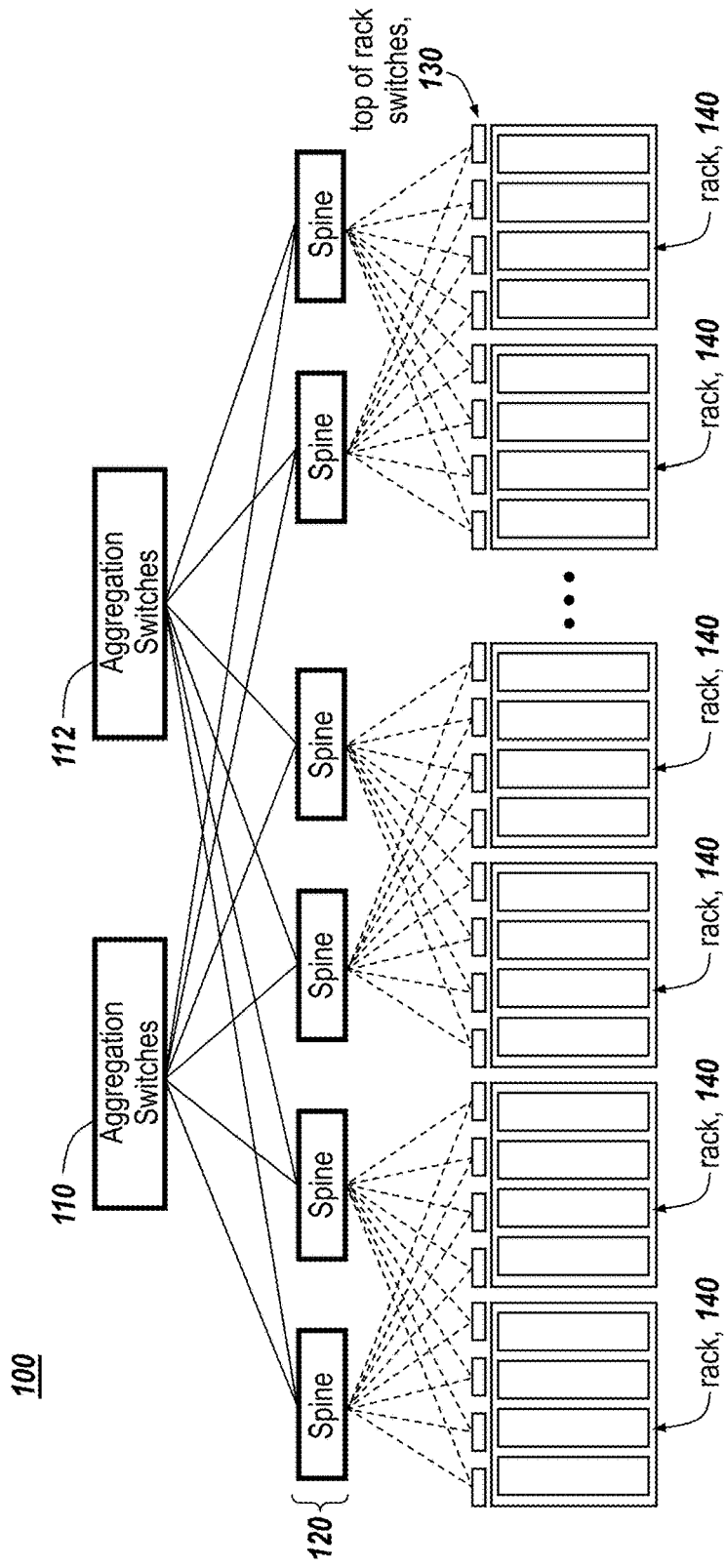
FIG. 1 depicts a conventional fat-tree network for a datacenter.
Figure 2:
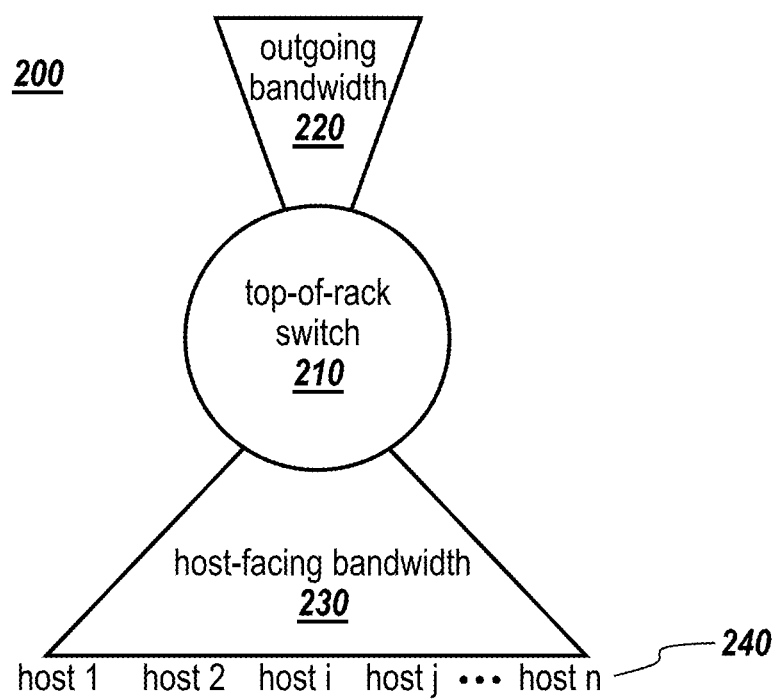
FIG. 2 provides a graphical depiction illustrating oversubscription in a conventional datacenter network.

Moreover, the described topology exploits stranded bandwidth at the ToR switch level. Specifically, in conventional networks, such as the one illustrated in FIG. 1, there are m uplinks from a ToR switch which are shared by h hosts making the concentration c=h/m. When all hosts are using the network simultaneously, the expected egress bandwidth is constrained by the bottleneck and the expected average host link utilization is m/h and the stranded bandwidth at each ToR switch is expressed as (1−m/h). The hierarchical tree of G-cubes topology enables the use of the stranded bandwidth of (1−m/h).

Figure 3A:
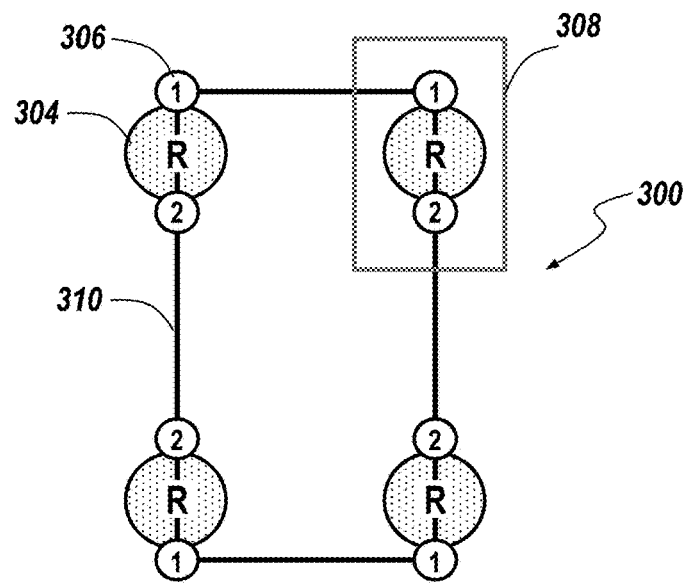
FIG. 3A depicts an exemplary indirect binary 2-cube, i.e. an indirect G-cube (2, 2)
Figure 3B:
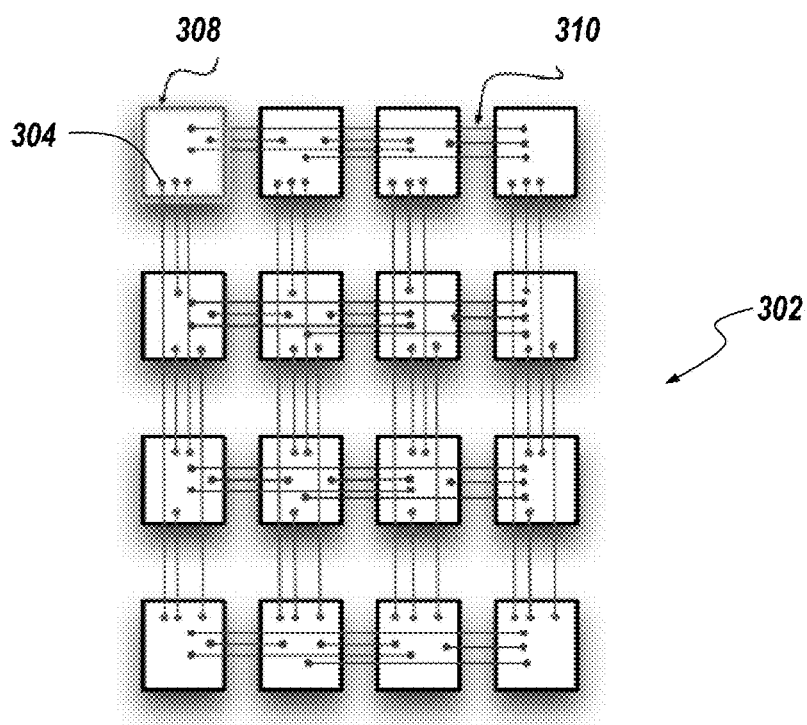
FIG. 3B depicts an exemplary indirect G-cube (2, 4)

The indirect G-cube discussed herein may be described in terms of two parameters: G-cube (n, k) where n is the number of dimensions and k is the radix. In a given multi-stage network topology, h hosts may be attached to a ToR switch. Each of the h hosts may have a 2-ported NIC with one port connected to the G-cube and the other port connected to a tier of the multi-stage network. In such a network, the number of hosts is equal to $N=hk^n=n(k-1)k^n$ When the radix k is equal to 2, the indirect generalized n-cube is called an indirect binary n-cube. The indirect binary n-cube topology is described in detail in a related application, U.S. patent application Ser. No. 14/144,706 filed concurrently with the present application. FIGS. 3A and 3B illustrate an indirect binary 2-cube 300 and an indirect generalized 2-cube 302, respectively. In FIG. 3A, the radix k=2 and the number of dimensions n=2. Thus, the total number of hosts 306 in the indirect binary 2-cube 300 is $N=n(k-1)k^n=2(2-1)2^2=8$. The 8 hosts 306 are attached to ToR switches 304. The number of ToR switches may be determined as $S=k^n$. Accordingly, the indirect binary 2-cube 300 includes $S=k^n=2^2=4$ ToR switches 304. There are h=n(k−1)=2(2−1)=2 hosts 306 connected to each ToR switch 304. In this topology, each ToR switch 304 connects to k−1=2−1=1 host 306 in each of the other ToR switches in the same direction via links 310. Each ToR switch 304 and the n(k−1) hosts 306 attached thereto form a rack 308. Thus, the indirect binary 2-cube 300 includes 4 racks 308.

In FIG. 3B, the radix k=4 and the number of dimensions n=2. Thus, the total number of hosts 306 in the indirect generalized 2-cube 302 is $N=n(k-1)k^n=2(4-1)4^2=96$. The number of ToR switches 304 in the indirect generalized 2-cube 302 may be determined as $S=k^n=4^2=16$. In this topology, each ToR switch 304 connects to k−1=4−1=3 hosts 306 in each of the other ToR switches in the same direction via links 310. There are h=n(k−1)=2(4−1)=6 hosts 306 connected to each ToR switch 304. Each ToR switch and the hosts 306 attached thereto form a rack 308. Thus, the indirect generalized 2-cube 302 includes 16 racks 308.

Figure 4:
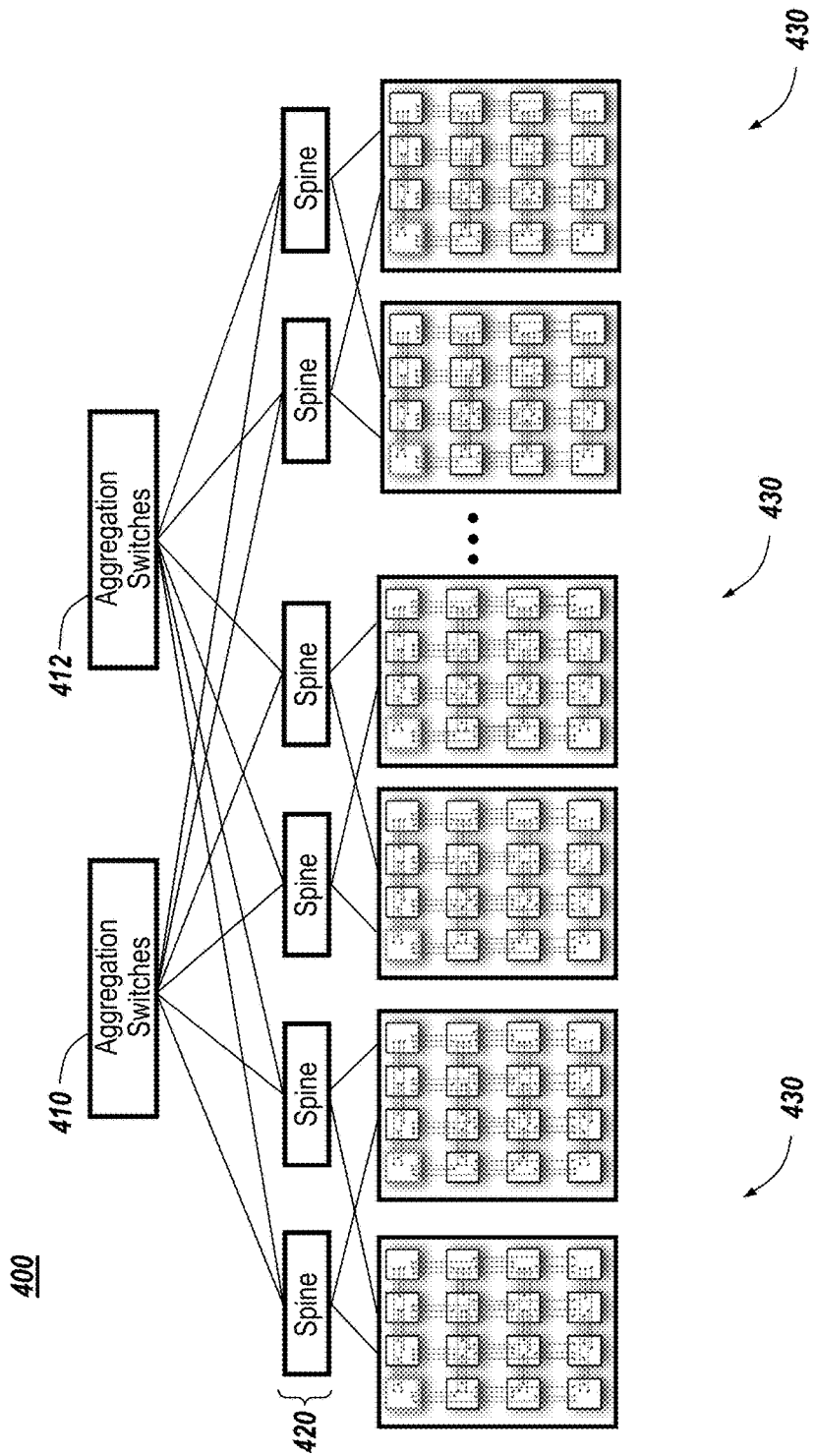
FIG. 4 depicts an example of a topology provided by exemplary embodiments described herein.

As shown in FIG. 4, the proposed topology 400 differs from conventional fat-tree topology 100 in that the leaves of the fat-tree topology are replaced with indirect generalized n-cubes 430 among a number of nearby hosts. The indirect generalized n-cubes 430 are referred to as an indirect hypercube since the switches are not directly connected as in a generalized hypercube. Specifically, in the proposed topology 400, each host has a 2-ported (or more generally, a multi-port) NIC, with one port used to connect to a first tier of a multi-stage network, e.g. spine switches 420, like a conventional fat-tree topology 100. The second port of the 2-ported NIC is used to connect to another host within a dimension of an indirect generalized n-cube 430. By grouping together nearby hosts, each host is linked to a peer host in a given dimension and a tightly-coupled cube of size $N=n(k-1)k^n=2(4-1)4^2=96$ may be formed.

As provided above, the nearby hosts may be grouped together using a multi-port NIC. The NIC is described below in greater detail with respect to FIGS. 5 and 6 illustrating a conventional single-ported NIC and a 2-ported NIC, respectively.

Figure 5:
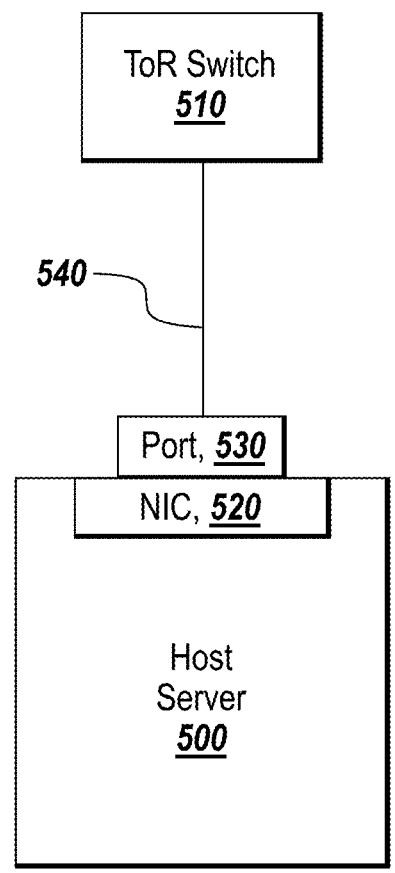
FIG. 5 depicts a conventional configuration of how a host server is coupled to a conventional network in a datacenter configuration.

FIG. 5 depicts the conventional configuration between a host server 500 and the network. The host server 500 includes a NIC 520 that has a single ingress/egress port 530. The single ingress/egress port 530 is used to couple the host server 500 to a ToR switch 510 of the network via connection 540.

Figure 6:
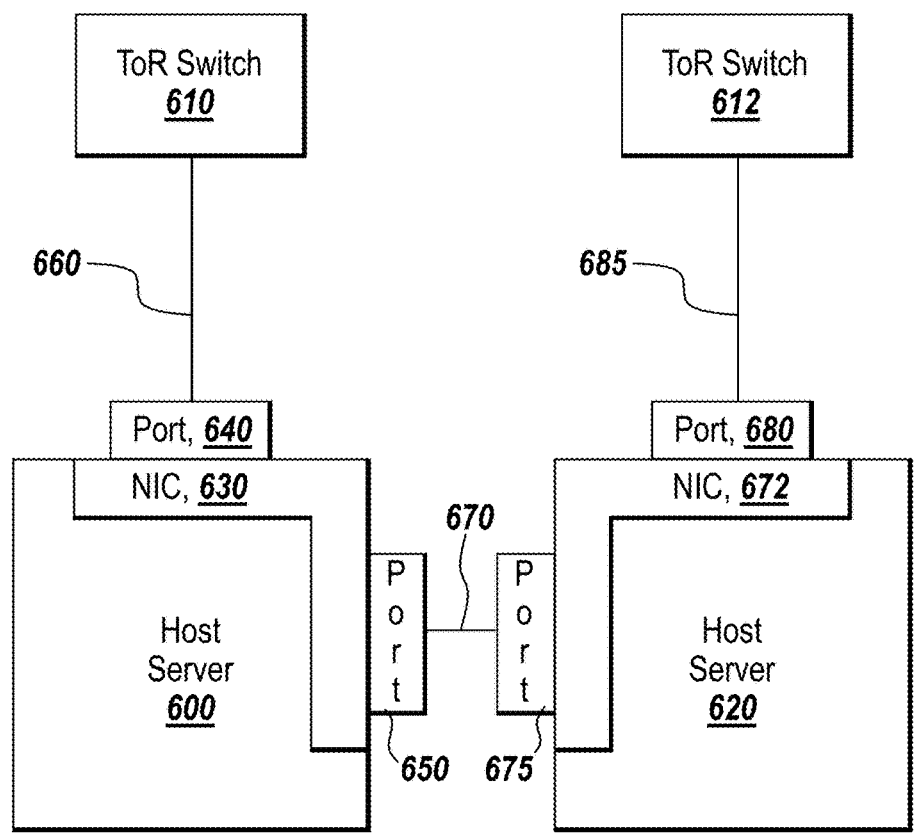
FIG. 6 depicts how a host server is connected to a network and another host server in an exemplary embodiment described herein.

FIG. 6 depicts the arrangement proposed for exemplary embodiments herein. The host server 600 has a NIC 630 that has 2 ports: port 640 and port 650. Port 640 creates a connection 660 with a ToR switch 610 of the network. Port 650, however, is used to connect the host server 600 via connection 670 with host server 620. In particular, port 650 of host server 600 is connected to port 675 of host server 620 via connection 670. The port 675 of host server 620 is provided on NIC 672 that has a second port 680 to connect the host server 620 to ToR switch 612 of the network via connection 685.

Referring back to FIG. 4, the topology 400 incorporates aggregation switches 410 and 412 as well as the spine switches 420. However, unlike the conventional fat-tree topologies (such as the fat-tree topology 100 illustrated in FIG. 1), the spine switches 420 of the proposed topology 400 are connected to the ToR switches configured in the indirect generalized n-cube arrangement.

As provided above, the proposed G-cube topology builds upon existing tree-like networks by using stranded bandwidth below the oversubscription point at the ToR switches. Thus, the proposed topology does not add additional switches. Rather, the proposed topology increases the utilization of ToR switches to forward packets by taking inter-switch hops within the G-cube. The size of the G-cube may be reconfigured to allow a few hundred to a few thousand hosts. The size of a given G-cube depends upon the number of dimensions n and the radix k.

The specific values for n and k may depend on design constraints such as the switch radix (number of ports) on the ToR switch, packaging density and cooling constraints of the datacenter, over-subscription ratio at the ToR switch, path diversity and fault resilience requirements, application bandwidth demands for local resources (e.g., flash memory, disk, remote direct memory access (RDMA)) from nearby hosts, and cost constraints (i.e., smaller G-cube configurations may be less expensive if they are able to use shorter electrical cables to connect peers). Accordingly, it is generally desirable to choose a G-cube(n, k) with as few dimensions n, and large radix k so that the G-cube satisfies both the packaging constraints, number of available ToR ports, performance and cost goals. Exemplary ways to increase the size of the indirect G-cube may include, but is not limited to, increasing the number of dimensions n, increasing the radix k and dimension-channel slicing.

The size of the indirect G-cube may be scaled by fixing the radix k and increasing the number of dimensions n. An example for increasing the dimensions while keeping the radix fixed at k=2 (e.g. indirect binary n-cube) is provided in U.S. patent application Ser. No. 14/144,706 filed concurrently with the present application.

The size of the indirect G-cube may be scaled by fixing the number of dimensions n and vary the radix k to allow larger G-cubes to be constructed. Keeping the number of dimensions n low has the benefit of reducing latency since a minimally-routed packet will require at most n inter-switch hops to reach the destination.

The size of the indirect G-cube may also be scaled using dimension-channel slicing. Certain software defined networking approaches, such as OpenFlow, support slicing, where the network may be divided into "slices." Each slice controls its own packet forwarding. That is, there is no implicit communication between the slices. Dimension-channel slicing replicates the number of hosts in each virtual switch to provide m independent channels in each dimension. With m independent slices in each of the n dimensions, the number of hosts, $N_m$, is given by: $N_m=mn(k-1)k^n$. The m independent slices in each of n dimensions provide even more path diversity since the slices provide m identical channels per dimension between each switch. As a result, losing a single link still allows m−1 alternate channels to route without requiring expensive rerouting or non-minimal paths to avoid faults.

Dimension-channel slicing is also very useful for deadlock avoidance when link-level flow control becomes blocked due to insufficient input buffer space. For example, the m slices can be used to implement m independent channels and provide a deadlock-free ordering of the channels. Accordingly, dimension-channel slicing provides additional physical channels for increased path diversity for hotspot avoidance, path redundancy for fault tolerance, performance isolation to physically segregate urgent traffic, dedicated physical channel for adaptive routing and out-of order message delivery, and deadlock-avoidance channels for cyclic dependencies or protocol deadlock.

Even though it is possible to increase the size of an indirect G-cube by increasing the values of the number of dimensions and the radix, an optimal number of indirect G-cube dimensions may be determined. The G-cube network topology discussed herein is used for increasing the bisection bandwidth and path diversity. The number of dimensions n and the radix k of the network are essential design parameters that largely determine the latency and bandwidth characteristics of the network. Thus, it must be ensured that the bisection bandwidth of the G-cube is equal to or more than the bisection of the fat-tree network upon which the indirect G-cube network is built. Stated another way, the capacity of the indirect G-cube, $\gamma_g$, must exceed the capacity of the fat-tree, $\gamma_f$, that are used for global links interconnecting the indirect G-cubes. For an over-subscribed fat-tree, the degree of oversubscription $\delta_o$ at each ToR limits the overall throughput such that $\gamma_g \leq \gamma_f \leq \delta_o$.

Figure 7:
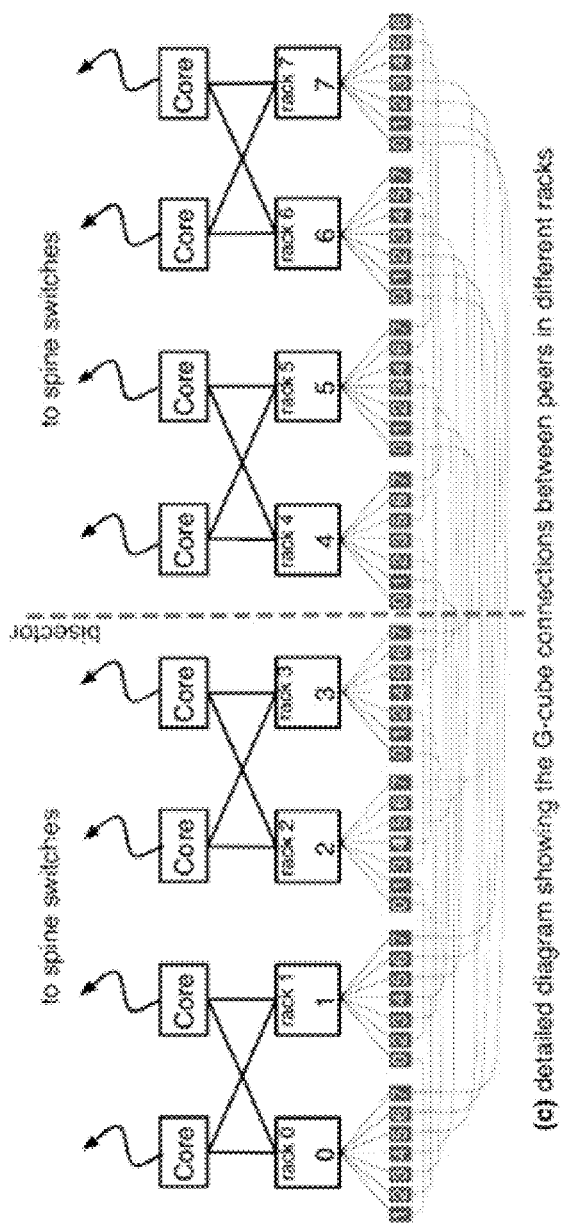
FIG. 7 depicts an example of a Dragon Tree topology provided by exemplary embodiments described herein.

In some embodiments, the number of dimensions of an indirect G-cube may be set to n=1 to create a flat indirect G-cube. By flattening the indirect G-cube, the bisection bandwidth among hosts in the G-cube group may be increased. Reducing the number of dimensions to n=1 and increasing the radix k, as shown in FIG. 7, allows low latency, and maximizes bisection bandwidth to hosts within the same indirect G-cube. By selecting n=1, and varying the radix k, to best fit the system packaging (i.e. number of hosts in each ToR switch) the network diameter is kept to a minimum, and the bisection bandwidth is maximized.

Figure 8:
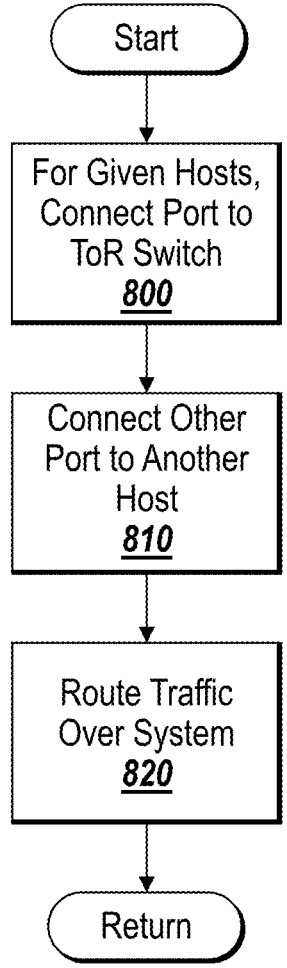
FIG. 8 is a flow chart depicting an overview of steps that may be performed in exemplary embodiments described herein.

FIG. 8 shows a flow chart that sets forth an overview of the steps that are performed in exemplary embodiments. For given hosts in the datacenter configuration, one of the ports of the NIC is connected to a ToR switch (Step 800). The other port is then connected to another host (Step 810). As will be described in more detail below, a number of different possible indirect n-cube configurations are available using this approach. Once the host and the ToR switches are interconnected appropriately, traffic may be routed over the system (Step 820).

Figure 9:
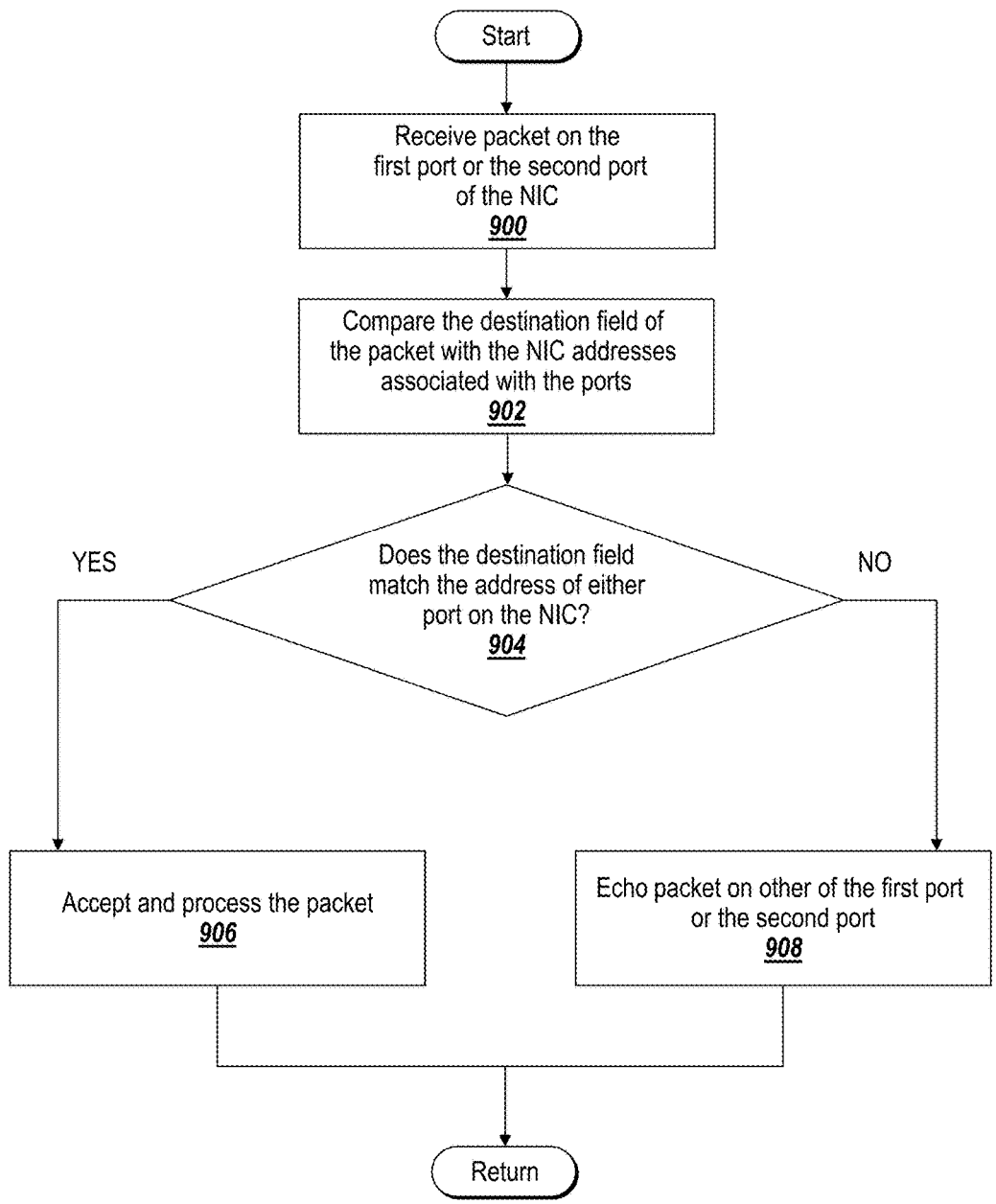
FIG. 9 is a flow chart that sets forth an overview of the steps that are performed in exemplary routing.

The resulting network with a topology as described above employs certain routing rules. FIG. 9 shows a flow chart that sets forth an overview of the steps that are performed in exemplary routing. A packet is received at a first port or a second port of a NIC (Step 900). Upon the receipt of the packet at one of the ports of the NIC, the destination field of the packet is inspected to determine if the packet is destined for the host. The determination is made by comparing the destination field of the packet with the NIC addresses associated with the two ports on the host (Step 902). If the destination field matches the address of either port on the NIC ("yes" to Step 904), the packet is accepted by the NIC and passed up the network stack where the packet is processed and placed in messaging buffers (Step 906). If the packet is not a broadcast packet ("no" to Step 904), the packet is echoed on the other port, i.e. a packet received on the first port will be transmitted on the second port and a packet received on the second port will be transmitted on the first port (Step 908).

The foregoing routing functionality can be implemented in software or hardware within each NIC or processing host, or among the switches themselves, or some combination of these approaches. Likewise, source-based routes can be asserted when a packet originates, where the packet must know all the hops of its path a priori. Alternatively, a route may be specified in a distributed manner, incrementally (hop by hop) as the packet traverses each switch from the source to the destination. A "lookup table" or database may be used to determine the proper output port at each hop of the route. The lookup table may be indexed by the destination host identifier (destination address) or a tuple consisting of, for example, the source address, destination address, source port, destination port, and virtual network. The hierarchical network described herein provides several routing alternatives which vary in complexity and channel utilization. An exemplary routing alternative is dimension order routing (DOR) which provides minimal deadlock-free routing. For uniform traffic, DOR provides optimal performance (i.e., lowest latency) and uniform channel utilization by spreading the traffic over the available physical links in the network. In the presence of faults, DOR becomes more difficult to provide deadlock-safe routes while providing good load balance.

An example of suitable pseudo code for routing a packet is as follows:
if          [(port0.address==packet.address) or
    (port1.address==packet.address) or
    (packet.type==broadcast)] then accept packet and pass to networking stack to deposit in message buffers
if [packet←receive(port0)] then
    send(packet, port1)
else
    send(packet, port0)

One or more of the above-described acts may be encoded as computer-executable instructions executable by processing logic. The computer-executable instructions may be stored on one or more non-transitory computer readable media. One or more of the above described acts may be performed in a suitably-programmed electronic device.

Figure 10:
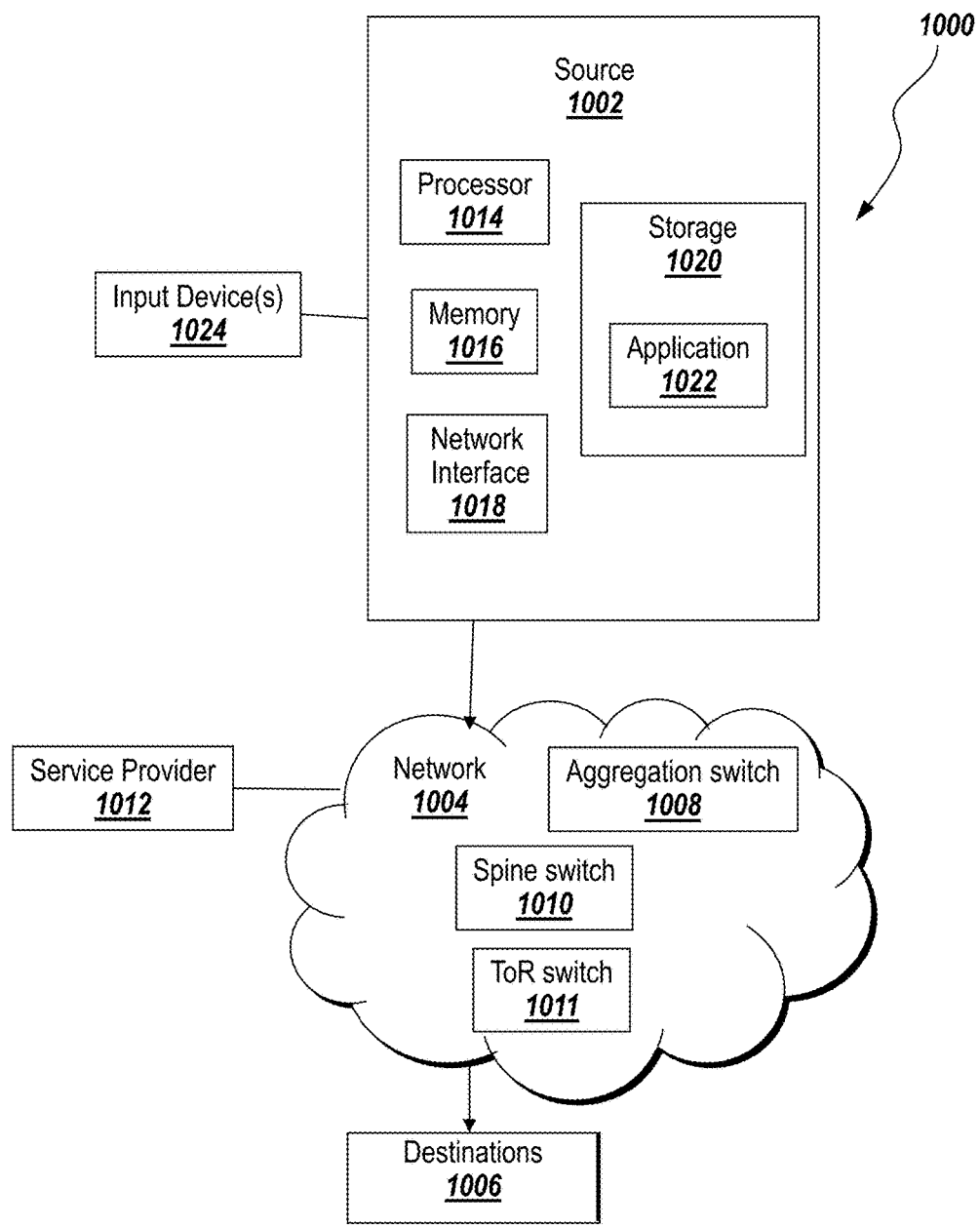
FIG. 10 depicts an exemplary computing device and network implementation of processing performed according to exemplary embodiments described herein.

FIG. 10 illustrates a communication system 1000 for conveying a data packet from a source 1002 to a specific destination 1006 according to the teachings of the present invention. The illustrated system 1000 can include any conventional arrangement of networking components, and according to one embodiment, can include a source 1002 that is coupled to and otherwise communicates with an overall network 1004. The network 1004 may have the proposed tree of cubes hierarchical topology described herein. The network 1004 in turn is coupled to a plurality of destinations 1006, such as the servers and/or hosts discussed above. In some embodiments, the plurality of destinations 1006 may be incorporated as a part of the network 1004. The embodiment of FIG. 10 is exemplary, and other embodiments can include more devices, fewer devices, or devices in arrangements that differ from the arrangement of FIG. 10.

The source 1002 can be any suitable electronic device and can take many forms, including but not limited to a computer, workstation, server, network computer, quantum computer, optical computer, Internet appliance, mobile device, a pager, a tablet computer, a smart sensor, application specific processing device, and the like. The source 1002 as illustrated herein is merely illustrative and may take other forms.

The source 1002 may also include selected components for generating and/or forwarding data packets. The components may be implemented using hardware based logic, software based logic and/or logic that is a combination of hardware and software based logic (e.g., hybrid logic). The source 1002 may include a processor 1012 that can include logic that can interpret, execute, and/or otherwise process information contained in, for example, a memory element 1014. The information may include computer-executable instructions and/or data that may be implemented by or in one or more embodiments of the present invention. The processor 1012 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor 1002 may include a single core or multiple cores. Moreover, the processor 1002 may include a system-on-chip (SoC) or system-in-package (SiP) design.

The source 1002 may also include one or more tangible non-transitory computer-readable storage media for storing one or more computer-executable instructions or software that may be implemented by or in one or more embodiments of the present invention. The non-transitory computer-readable storage media may be, for example, a memory 1014 or storage element. The memory 1014 may comprise a ternary content addressable memory (TCAM) and/or a RAM that may include RAM devices that may store the information.

The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, memristors, or other types of RAM devices.

The source 1002 may also be a virtual machine (VM) for executing instructions loaded in the memory 1014. The virtual machine may be provided to handle a process running on multiple processors so that the process may appear to be using only one computing resource rather than multiple computing resources. Virtualization may be employed in the source 1002 so that infrastructure and resources in the source 1002 may be shared dynamically. Multiple VMs may be resident on a single client device.

The source 1002 may also include a network interface 1016 so as to be able to interface to the network 1004. The network 1004 can be a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 1016 may include a built-in network adapter, network interface card, personal computer memory card international association (PCMCIA) network card, card bus network adapter, wireless network adapter, universal serial bus (USB) network adapter, modem or any other device suitable for interfacing the client device to any type of network 1004 capable of communication and performing the operations described herein.

The source 1002 may also be coupled to one or more input devices 1018, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. The source 1002 may also include other suitable I/O peripherals.

A storage device 1020 may also be associated with the source 1002 or with any other system component. The storage device 1020 may be accessible to the processor via an I/O bus. The information may be executed, interpreted, manipulated, and/or otherwise processed by the processor 1012. The term storage device 1020 as used herein for example with the source 1002 or any other system component may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device 1020. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the present application.

The storage device 1020 may further store application(s) 1022, and the source 1002 can be running an operating system (OS). Examples of suitable operating systems may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 1020 may further include rules which describe how messages should be forwarded over a communications system. The rules may be used to forward messages or information received at the source 1002. Accordingly, the source 1002 may serve as a forwarding device, switch, or router.

The storage device 1020 may include logic for implementing one or more selected communication protocols. The communication protocol may be a protocol which provides an interface for accessing and modifying the functionality of the forwarding plane of the client device.

One or more embodiments of the present invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

FIG. 10 also illustrates the network 1004 suitable for implementing one or more embodiments of the present invention. The network 1004 is merely exemplary, and other embodiments can include more devices, fewer devices, or devices in arrangements that differ from the arrangement of FIG. 10.

The illustrated network 1004 may transport data from a source (e.g., source 1002) to one or more destinations (e.g., destinations 1006). The network 1004 may employ any selected combination or arrangements of network devices, such as routers, switches, firewalls, and/or servers and connections (e.g., links) (not shown) to transport data. Data may refer to any type of machine-readable information having substantially any format that may be adapted for use in one or more networks and/or with one or more devices described herein. Data may include digital information or analog information. The data may be packetized and/or non-packetized, although the present invention assumes the use of packetized data.

The network 1004 may be a hardwired network using wired conductors and/or optical fibers and/or may be a wireless network using free-space optical, radio frequency (RF), and/or acoustic transmission paths. In one implementation, the network 1004 may be a substantially open public network, such as the Internet. In another implementation, the network 1004 may be a more restricted network, such as a corporate virtual network. The network 1004 may include the Internet, intranet, Local Area Network (LAN), Wide Area Network (WAN), Metropolitan Area Network (MAN), wireless network (e.g., using IEEE 802.11), or other type of network. The network 1004 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration. The network 1004 may have the tree of cubes hierarchical topology described herein. The network 1004 may include a plurality of switching devices such as routers and/or switches, e.g. aggregation switches 1008, spine switches 1010 and/or ToR switches 1011.

The system 1000 can also include a service provider 1012 that makes a service available to another component of the system. For example, the service provider 1012 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The system 1000 also includes the plurality of destinations 1006. The destinations 1006 may include a device that receives information over the network 1004. For example, the destinations 1006 may be a plurality of servers and/or hosts that receive data from the source 1002. Those of ordinary skill will readily recognize that the system 1000 may employ any suitable number of servers/hosts.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A system having an indirect generalized hypercube topology with a pre-determined number of dimensions n and a pre-determined radix k greater than 2, comprising:

$k^n$ racks arranged in n dimensions with k racks in each dimension, each rack comprising a switching element and at least $n(k-1)$ hosts, wherein:

each host of the at least $n(k-1)$ hosts in each rack is directly connected to the switching element in its own rack and to one of the at least $n(k-1)$ hosts in a different rack via a direct physical connection; and the at least $n(k-1)$ hosts in each rack collectively connect, via respective direct physical connections, to one of the at least $n(k-1)$ hosts in each of $(k-1)$ different racks in each dimension, thereby forming an indirect generalized hypercube.

2. The system of claim 1, wherein:

each host comprises a first port and a second port, the first port directly connected to the switching element in the host's own rack and the second port directly connected to the one of the at least $n(k-1)$ hosts in the different rack.

3. The system of claim 2, wherein:

each host comprises a multi-port network interface controller, the multi-port network interface controller providing the first port and the second port of the first host.

4. The system of claim 1, wherein each rack comprises $n(k-1)$ hosts.

5. The system of claim 1, comprising $n(k-1)k^n$ hosts.

6. The system of claim 1, wherein the network is a datacenter network.

7. The system of claim 1, wherein:

the network is a multi-tiered network, and each switching element is provided in a first tier of the multi-tiered network.

8. The system of claim 7, wherein each switching element is connected to a spine switch in a second tier of the multi-tiered network.

9. The system of claim 7, wherein the plurality of racks form a leaf of a fat-tree topology network.

10. A method of creating an indirect generalized hypercube topology computer network with a pre-determined number of dimensions n and a pre-determined radix k greater than 2, comprising:

connecting $k^n$ racks in n dimensions with k racks in each dimension, each rack comprising a switching element and at least $n(k-1)$ hosts, wherein:

each host of the at least $n(k-1)$ hosts in each rack is directly connected to the switching element in its own rack and to one of the at least $n(k-1)$ hosts in a different rack via a direct physical connection; and the at least $n(k-1)$ hosts in each rack collectively connect, via respective direct physical connections, to one of the at least $n(k-1)$ in each of $(k-1)$ different racks in each dimension, thereby forming an indirect generalized hypercube.

11. The method of claim 10, wherein:

each host comprises a first port and a second port, the first port directly connected to the switching element in the host's own rack and the second port directly connected to the one of the at least $n(k-1)$ hosts in the different rack.

12. The method of claim 11, wherein:

each host comprises a multi-port network interface controller, the multi-port network interface controller providing the first port and the second port of the first host.

13. The method of claim 10, wherein each rack comprises $n(k-1)$ hosts.

14. The method of claim 10, wherein the indirect generalized hypercube topology computer network comprises $n(k-1)k^n$ hosts.

15. The method of claim 10, wherein the indirect generalized hypercube topology computer network is a datacenter network.

16. The method of claim 10, wherein:
the indirect generalized hypercube topology computer network is a multi-tiered network, and
each switching element is provided in a first tier of the multi-tiered network.

17. The method of claim 16, wherein each switching element is connected to a spine switch in a second tier of the multi-tiered network.

18. The method of claim 16, wherein the plurality of racks form a leaf of a fat-tree topology network.

\* \* \* \* \*